United States Patent

Hong et al.

[11] Patent Number: 5,976,617
[45] Date of Patent: Nov. 2, 1999

[54] INITIALIZATION METHOD OF PHASE TRANSFORMATION-TYPE OPTICAL DISK

[75] Inventors: Hyeon-chang Hong, Ansan; Byung-il Cho; Seung-tae Jung, both of Seongnam, all of Rep. of Korea

[73] Assignee: Samsung Electronics Co., Ltd., Suwon, Rep. of Korea

[21] Appl. No.: 09/115,241

[22] Filed: Jul. 14, 1998

[30] Foreign Application Priority Data

Dec. 30, 1997 [KR] Rep. of Korea ............ 97-77770
Feb. 13, 1998 [KR] Rep. of Korea ............ 98-4368

[51] Int. Cl.⁶ .................................................. B05D 5/06
[52] U.S. Cl. .................................. 427/162; 427/554
[58] Field of Search .................................... 427/162, 554

[56] References Cited

U.S. PATENT DOCUMENTS 5,608,710 3/1997 Minemura et al. ............ 369/116

FOREIGN PATENT DOCUMENTS 2-29927 1/1990 Japan.
3-76027 4/1991 Japan.
4-281219 10/1992 Japan.
10-112065 4/1998 Japan.

OTHER PUBLICATIONS

Effect of Initializaton Conditions on the Dynamic Characteristics and HREM Lattice Images of Phase Change Optical Disks (no date).

Primary Examiner—Janyce Bell
Attorney, Agent, or Firm—Staas & Halsey

[57] ABSTRACT

A method of initializing a phase transformation-type optical disk. The initialization method includes the steps of: (a) preparing a phase transformation-type optical disk in which a first dielectric layer, a recording layer including a small amount of crystalline structure in a major amorphous structure, a second dielectric layer and a reflective layer are sequentially deposited on a substrate; (b) irradiating a high power laser beam, which is enough to heat the recording layer to a temperature above its melting point, onto the optical disk, thereby transforming the crystalline structure in the recording layer into an amorphous structure; and (c) irradiating a lower power laser beam, which is capable of heating the recording layer to a temperature range above a recrystallization temperature and below its melting point, onto the optical disk, thereby transforming the amorphous structure of the recording layer into the crystalline structure.

20 Claims, 4 Drawing Sheets ly low power of laser beams of 3~6 mW is irradiated onto the amorphous recording layer 3 to crystallize the amorphous recording layer 3. Then, a high power of laser beams, e.g., 8~13 mW, which is enough to heat the recording layer 3 above the melting point thereof, is irradiated onto the crystalline recording layer 3, to change the crystalline phase into the amorphous phase having a lower reflective index, thereby recording information. That is, information is written or erased using the difference in reflective indices between the crystalline and amorphous phases.

INITIALIZATION METHOD OF PHASE TRANSFORMATION-TYPE OPTICAL DISK

CROSS-REFERENCE TO RELATED APPLICATIONS

This application claims the benefit of Korean Application Nos. 97-77770, filed Dec. 30, 1997 and 98-4368, filed Feb. 13, 1998, in the Korean Patent Office, the disclosures of which are incorporated herein by reference.

BACKGROUND OF THE INVENTION

1. Field of the Invention

The present invention relates to a method of initializing a phase transformation-type optical disk capable of overwriting data, and more particularly, to a method of initializing a phase transformation-type optical disk capable of improving jitter characteristics.

2. Description of the Related Art

In general, an optical disk is classified into a read only optical disk such as a CD-ROM, a rewritable optical disk capable of overwriting information, and a write once read many (WORM) optical disk capable of recording information once.

As the rewritable optical disk, a phase transformation-type optical disk has been widely used, which records information using the phase transformation of its recording layer. As shown in FIG. 1, the phase transformation-type optical disk 10 includes a first dielectric layer 2, a recording layer 3, a second dielectric layer 4 and a reflective layer 5 which are sequentially stacked on a substrate 1. The recording layer 3 is deposited in an amorphous phase. That is, as shown in FIG. 2A, the recording layer 3 has an amorphous portion A in which a small amount of crystalline grains (C) is distributed. For recording information in the recording layer 3, the recording layer 3 must be transformed from the amorphous phase to a crystalline phase by irradiating laser beams, which is called "initialization" of an optical disk.

That is, through the initialization, the state of the recording layer 3 is changed from the amorphous phase which has a reflective index that is relatively low, to the crystalline phase which has a reflective index that is relatively high.

In a conventional initialization method of an optical disk, low power of laser beams of 3~6 mW is irradiated onto the amorphous recording layer 3 to crystallize the amorphous recording layer 3. Then, a high power of laser beams, e.g., 8~13 mW, which is enough to heat the recording layer 3 above the melting point thereof, is irradiated onto the crystalline recording layer 3, to change the crystalline phase into the amorphous phase having a lower reflective index, thereby recording information. That is, information is written or erased using the difference in reflective indices between the crystalline and amorphous phases.

However, in the initialization of the recording layer 3, as shown in FIG. 2B, the amorphous portion A is changed into a crystalline portion A' containing small grains, and the small crystalline grains (C) grow to coarse crystalline grains C'. According to experimentation, it was observed that the crystals C having a diameter of 9~10Å, distributed in the amorphous portion A of the deposited recording layer, grew to grains having a diameter of approximately 13Å after initialization. Thus, after the initialization process, the small grains and coarse grains coexist, resulting in an inhomogeneous structure. Accordingly, jitter error increases. Here, jitter error represents deviation between the length of an information signal to be recorded in the recording layer 3 and the length of the actual recorded information signal. As such deviation increases, the playback characteristics deteriorate. As shown by the dotted lines in FIG. 5, the jitter error increases until the information is written and erased one to five times on the same position of the recording layer, thereby lowering reliability of the phase transformation-type optical disk. Meanwhile, the jitter error is relatively low after 5 write and erase processes. This is because the structure of the recording layer, which was not uniform in the initial state, gradually becomes homogeneous by repeated heating using the laser beams.

According to a second conventional method of initializing a phase transformation-type optical disk, a recording layer of an optical disk is crystallized by irradiating high power laser beams, e.g., 250~700 mW, onto the recording layer. However, as shown by the dot-and-dashed line of FIG. 5, jitter error increases over 1~10 rewriting processes. In particular, jitter error is the highest after two rewritings. Also, in the initialization process of an optical disk according to the second conventional method, crystals coexisting within the amorphous recording layer grow to make the structure uneven, thereby causing errors. Thus, a method of initializing a phase transformation-type optical disk, capable of suppressing the jitter errors which are quite high when several rewritings are performed at the initial stage, has been required.

SUMMARY OF THE INVENTION

To solve the above problems, it is an object of the present invention to provide a method of initializing a phase transformation-type optical disk, in which a grain structure of a recording layer is uniformly formed, thereby suppressing jitter errors.

To achieve the above and other objects of the present invention, there is provided a method of initializing a phase transformation-type optical disk, including the steps of: (a) preparing a phase transformation-type optical disk in which a first dielectric layer, a recording layer including a small amount of crystalline structure in a major amorphous structure, a second dielectric layer and a reflective layer are sequentially deposited on a substrate; (b) irradiating a high power of a laser beam, which is enough to heat the recording layer to a temperature above its melting point, onto the optical disk, thereby transforming the crystalline structure in the recording layer into an amorphous structure; and (c) irradiating a lower power of a laser beam, which is capable of heating the recording layer to a temperature range above a recrystallization temperature and below its melting point, onto the optical disk, thereby transforming the amorphous structure of the recording layer into the crystalline structure.

BRIEF DESCRIPTION OF THE DRAWINGS

The above and other objects and advantages of the present invention will become more apparent by describing in detail a preferred embodiment thereof with reference to the attached drawings in which.

DESCRIPTION OF THE PREFERRED EMBODIMENT

Reference will now made in detail to the present preferred embodiments of the present invention, examples of which are illustrated in the accompanying drawings refer to the like elements throughout. The embodiments are described below in order to explain the present invention by referring to the figures.

Figure 1:
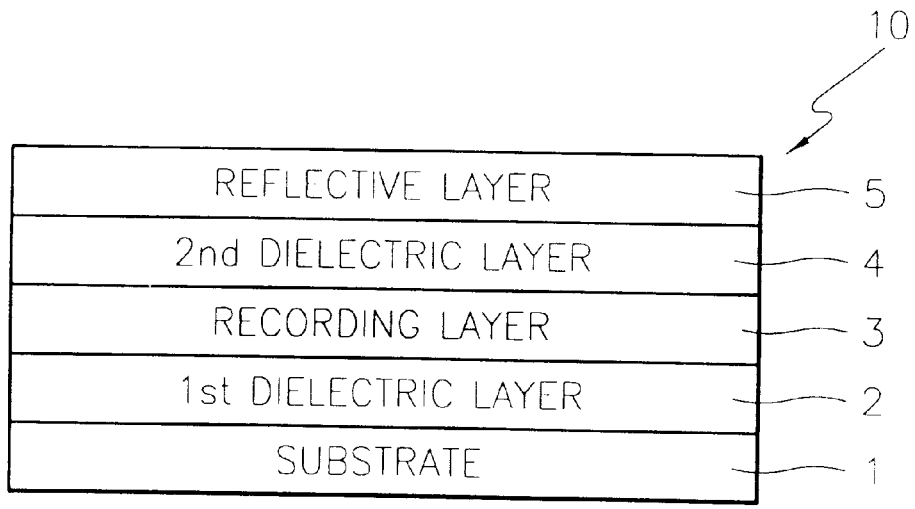
FIG. 1 is a vertical section view showing a structure of a phase transformation-type optical disk.
Figure 2A:
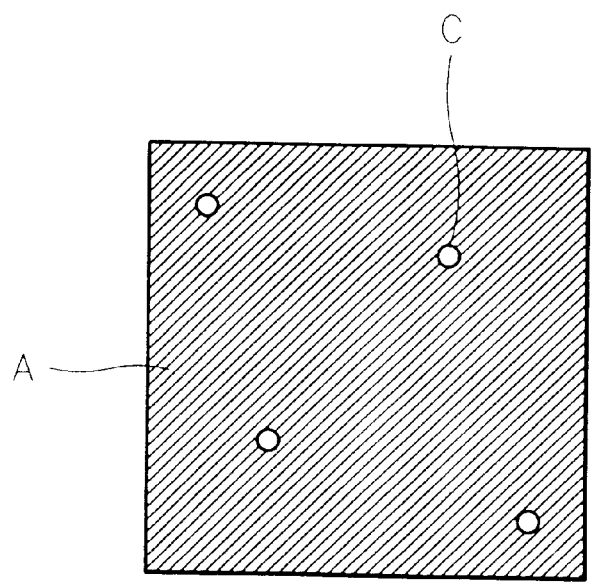
FIGS. 2A and 2B are diagrams showing a change in a structure of a recording layer of a phase transformation-type optical disk by a conventional initialization method.
Figure 2B:
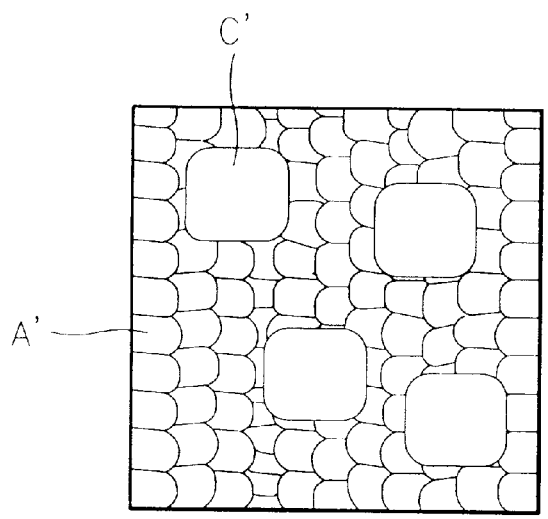
Figure 3:
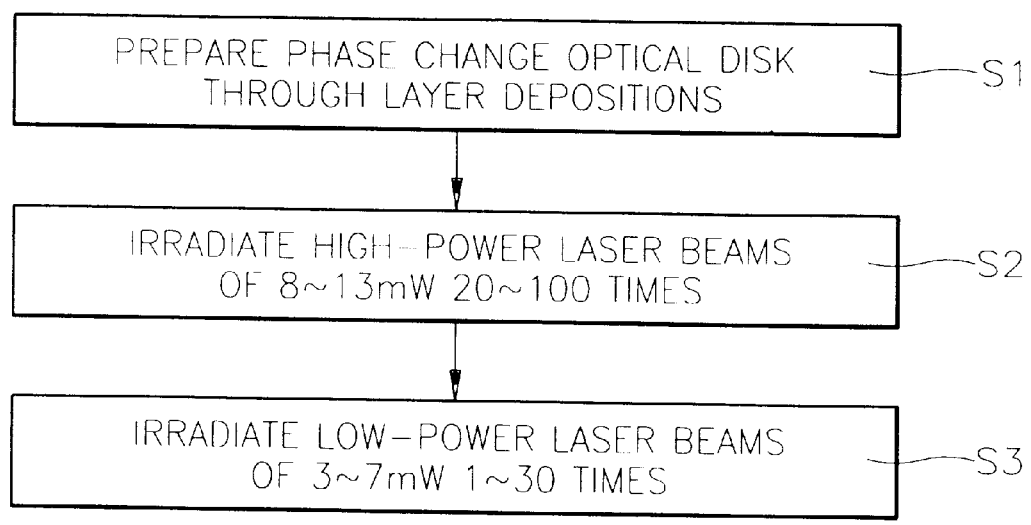
FIG. 3 is a flowchart illustrating a method of initializing a phase transformation-type optical disk according to an embodiment of the present invention.
Figure 4A:
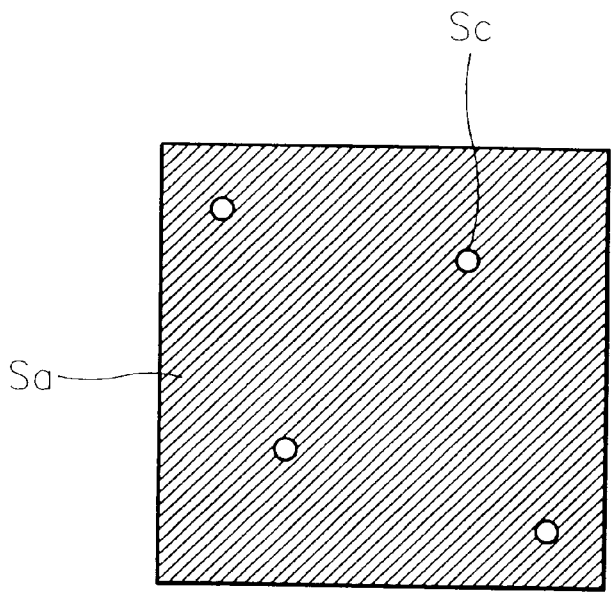
FIGS. 4A, 4B and 4C are diagrams showing a change in a structure of a recording layer of a phase transformation-type optical disk by the initialization method of FIG. 3.

Referring to FIG. 3, in an initialization method of a phase transformation-type optical disk according to a preferred embodiment of the present invention, first, in step S1, a phase transformation-type optical disk 10 is prepared, in which a first dielectric layer 2, a recording layer 3, a second dielectric layer 4 and a reflective layer 5 are sequentially stacked on a substrate 1 as shown in FIG. 1. The recording layer 3 has a major amorphous structure Sa and a minor crystalline structure Sc as shown in FIG. 4A.

Figure 4B:
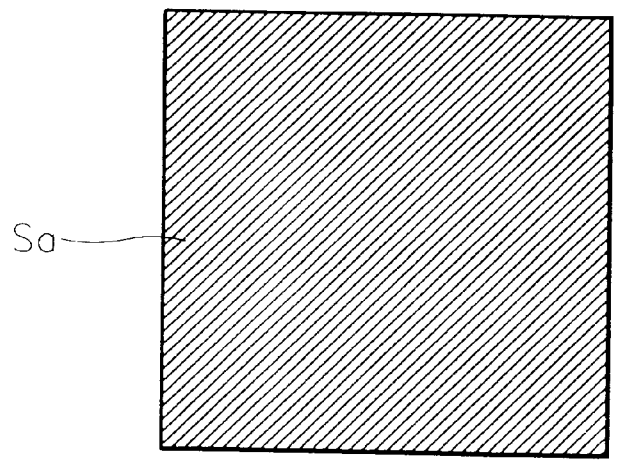

Then, in step S2, a high power laser beam for recording information, e.g., 8~13 mW, is irradiated onto the optical disk 10. The high power laser beam is enough to heat in an instant the recording layer 3 to a temperature above its melting point, transforming the crystalline structure Sc of the recording layer 3 into an amorphous structure Sa as shown in FIG. 4B. The change from the crystalline structure into the amorphous one is most effective when the high power laser beam is repeatedly irradiated 20~100 times.

Figure 4C:
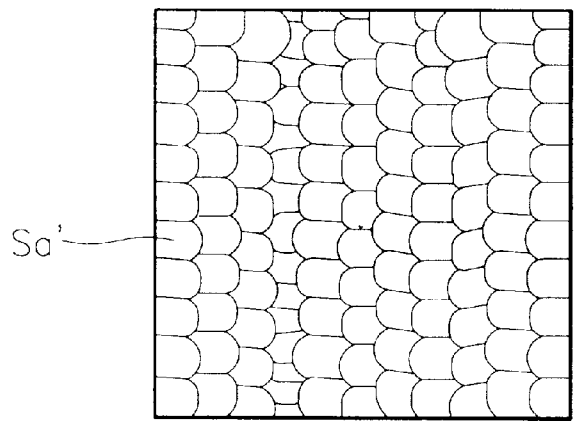

Next, in step S3, a low power laser beam for erasing information, e.g., 3~7 mW, is irradiated 1~30 times onto the optical disk 10, thereby heating the recording layer 3 at a temperature range above a recrystallization temperature and below the melting point. As a result, the amorphous structure Sa is changed into a crystalline structure Sa' as shown in FIG. 4C, so that the recording layer is initialized to record information.

Preferably, the wavelength of the laser beams of high and lower powers is in a range between 450~830 nm. This is because a cooling rate after heating is faster in this wavelength range than at other wavelengths.

According to the initialization method of the present invention, the crystalline structure in the recording layer 3 is transformed into the amorphous structure, and then the amorphous recording layer 3 is recrystallized, thereby resulting in a more uniform crystalline structure than that which results by the conventional method.

Figure 5:
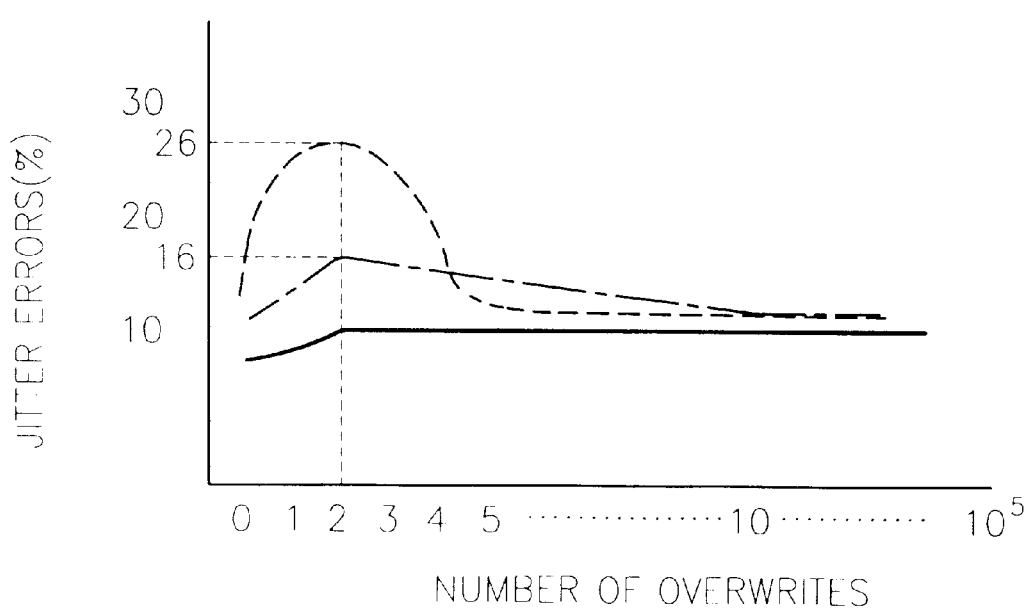
FIG. 5 is a graph comparatively showing jitter errors in optical disks which are initialized by first and second conventional methods and the present invention, respectively.

Jitter error of the phase transformation-type optical disk initialized by the method of the present invention was measured, and the result is shown as a solid line in FIG. 5. The phase transformation-type optical disk tested in this experimentation was formed and then initialized under the following conditions.

First, the first dielectric layer 2 made of ZnS—SiO$_2$, the recording layer 3 made of GeSbTe, the second dielectric layer 4 made of ZnS—SiO$_2$, and the reflective layer 5 made of Al—Ti are sequentially deposited on a substrate having a thickness of 0.6 mm. The recording layer 3 is deposited at a power of 40W under vacuum conditions of 6.8×10$^{-3}$ mbar. Here, the recording layer 3 may be formed of AgInSbTe instead of GeSbTe, and the reflective layer 5 may be formed of Cu instead of Al—Ti.

Also, in order to change the crystalline structure Sa of the deposited recording layer 3 into the amorphous structure Sa, a laser beam of a high power of 9.2 mW, having a wavelength of 680 nm, was irradiated 50 times. Then, a laser beam of a low power of 5.2 mW, having a wavelength of 680 nm, was irradiated once to crystallize the recording layer 3, thereby completing the initialization of the optical disk 10.

As can be seen from FIG. 5, the optical disk initialized by the present invention shows jitter error within 2% even when the recording is repeated 10 times, which is considerably low compared with the cases of optical disks initialized by the conventional methods (expressed by the dotted line and the dot-and-dashed line) where the jitter error was approximately 26% and 16%, respectively, after two recordings.

As described above, in the initialization method of the phase transformation-type optical disk according to the present invention, the crystalline structure of the recording layer can be uniform, so that jitter error after 10 times or less of repeated recordings can be markedly reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of initializing a phase transformation-type optical disk, comprising the steps of:
    (a) sequentially depositing a first dielectric layer, a recording layer including a minority amount of a first crystalline structure in a majority amorphous structure, a second dielectric layer and a reflective layer on a substrate;
    (b) irradiating a first laser beam of a first power onto the optical disk, to heat the recording layer to a first temperature above a melting point thereof, to transform the first crystalline structure in the recording layer into the amorphous structure; and
    (c) irradiating a second laser beam of a second power lower than the first power onto the optical disk, to heat the recording layer to a second temperature range above a recrystallization temperature and below the melting point thereof, to transform the amorphous structure of the recording layer into a second crystalline structure.

2. The method of claim 1, wherein the first laser beam has a power output between 8~13 mW, and said step (b) comprises the step of repeatedly irradiating the first laser beam onto the recording layer 20~100 times.

3. The method of claim 2, wherein the first laser beam has a wavelength of 450~830 nm.

4. The method of claim 1, wherein the second laser beam has a power output between 3~7 mW, and said step (c) comprises the step of irradiating the second laser beam onto the recording layer 1~30 times.

5. The method of claim 4, wherein the second laser beam has a wavelength of 450~830 nm.

6. The method of claim 1, wherein the recording layer is made of GeSbTe.

7. The method of claim 1, wherein said step (a) comprises the step of depositing the recording layer on the dielectric layer at a power of approximately 40 W under vacuum conditions of approximately 6.8×10$^{-3}$ mbar.

8. The method of claim 1, wherein the recording layer is made of AgInSbTe.

9. The method of claim 1, wherein:
    the first dielectric layer is ZnS—SiO$_2$;
    the recording layer is made of GeSbTe;

the second dielectric layer is made of ZnS—SiO$_2$; and the reflective layer is made of Al—Ti.

10. The method of claim 9, wherein said step (a) comprises the step of depositing the recording layer on the dielectric layer at a power of approximately 40 W under vacuum conditions of approximately 6.8×10$^{-3}$ mbar.

11. The method of claim 1, wherein:

the first dielectric layer is ZnS—SiO$_2$;

the recording layer is made of AgInSbTe;

the second dielectric layer is made of ZnS—SiO$_2$; and the reflective layer is made of Cu.

12. A method initializing a phase transformation-type disk having a substrate, a first dielectric layer, a recording layer including a minority amount of a first crystalline structure in a majority amorphous structure, a second dielectric layer and a reflective layer in sequential order, comprising the steps of:

(a) converting the first crystalline structure into the amorphous structure; and (b) converting the amorphous structure into a second crystalline structure.

13. The method of claim 12, wherein said step (a) comprises the step of heating the recording layer above a melting point thereof to convert the first crystalline structure into the amorphous structure; and said step (b) comprises the step of heating the recording layer to a temperature above a recrystallization temperature and below the melting point thereof, to convert the amorphous structure to the second crystalline structure.

14. The method of claim 13, wherein:

the step of heating the recording layer above the melting point thereof comprises the step of irradiating a first laser beam of a first power on the optical disk; and the step of heating the recording layer to a temperature above a recrystallization temperature and below the melting point thereof comprises the step of irradiating a second laser beam of a second power less than the first power on the optical disk.

15. The method of claim 14, wherein the step of irradiating a first laser beam of a first power on the optical disk comprises the step of repeatedly irradiating the first laser beam on the optical disk 20~100 times; and the step of heating the recording layer to a temperature above a recrystallization temperature and below the melting point thereof comprises the step of irradiating the second laser beam on the optical disk 1~30 times.

16. The method of claim 13, wherein the recording layer is made of GeSbTe.

17. The method of claim 13, wherein the recording layer is made of AgInSbTe.

18. The method of claim 13, wherein:

the first dielectric layer is ZnS—SiO$_2$;

the recording layer is made of GeSbTe;

the second dielectric layer is made of ZnS—SiO$_2$; and the reflective layer is made of Al—Ti.

19. The method of claim 13, wherein:

the first dielectric layer is ZnS—SiO$_2$;

the recording layer is made of AgInSbTe;

the second dielectric layer is made of ZnS—SiO$_2$; and the reflective layer is made of Cu.

20. A method initializing a phase transformation-type disk, comprising the steps of:

(a) forming a substrate, a first dielectric layer, a recording layer including a minority amount of a first crystalline structure in a majority amorphous structure, a second dielectric layer and a reflective layer in sequential order;

(b) converting the first crystalline structure into the amorphous structure; and (c) converting the amorphous structure into a second crystalline structure.

* * * * *

UNITED STATES PATENT AND TRADEMARK OFFICE
CERTIFICATE OF CORRECTION

PATENT NO.:     5,976,617
DATED      :    November 2, 1999
INVENTOR(S):    Hyeon-chang HONG et al:

It is certified that [an/error[s]] appears in the above-identified patent and that said Letters Patent is hereby corrected as shown below:

Column 3, line 63,    "AgInSbTe" should be --AgInSbTe--.
    Column 4, line 64,    "AgInSbTe" should be --AgInSbTe--.
    Column 5, line 9,     "AgInSbTe" should be --AgInSbTe--.

Signed and Sealed this

Third Day of October, 2000

Attest:

Q. TODD DICKINSON

*Attesting Officer*       *Director of Patents and Trademarks*